US012811519B2

(12) United States Patent
Liu et al.

(10) Patent No.: US 12,811,519 B2
(45) Date of Patent: Nov. 24, 2026

(54) MOTOR DRIVER OF MODULATING DUTY CYCLE

(71) Applicant: ANPEC ELECTRONICS CORPORATION, Hsinchu (TW)

(72) Inventors: Yi-Cheng Liu, New Taipei City (TW); Chieh-Lung Chang, Taoyuan City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 275 days.

(21) Appl. No.: 18/736,486

(22) Filed: Jun. 6, 2024

(65) Prior Publication Data

US 2025/0309793 A1 Oct. 2, 2025

(30) Foreign Application Priority Data

Mar. 29, 2024 (TW) ................................. 113111901

(51) Int. Cl.
*H02P 1/52* (2006.01)

(52) U.S. Cl.
CPC ..................................... *H02P 1/52* (2013.01)

(58) Field of Classification Search
CPC ...... H02P 1/52; H02P 1/24; H02P 1/46; H02P 27/06; H02P 27/08; H02P 27/085; H02P 7/29; H02P 21/22; H02P 21/34; H02P 21/14; H02P 23/07; H02P 25/022; H02P 27/04; H02P 29/032; H02P 29/60; H02P 29/68; H02P 2205/01; H02P 2207/05; H02P 25/22; H02P 6/28; H02P 29/40; H02P 6/085; H02P 21/00; H02P 23/14; H02P 6/20; H02P 25/03; H02P 31/00; H02P 29/027; H02P 5/00; H02P 7/293; H02P 1/26; H02P 1/16; H02P 1/465; H02P 2209/09; H02P 25/04; H02P 7/06; H02P 9/30; H02P 9/302; H02P 6/08; H02P 8/04; H02P 8/12; H02P 8/14; H02P 6/32;

(Continued)

(56) References Cited

U.S. PATENT DOCUMENTS 5,859,519 A * 1/1999 Archer ...................... H02P 6/26
363/41
2008/0203964 A1 * 8/2008 Koike ................ G03G 15/5008
318/434

(Continued)

FOREIGN PATENT DOCUMENTS

CN 111034026 A 4/2020
TW 201828584 A 8/2018

*Primary Examiner* — Antony M Paul
(74) *Attorney, Agent, or Firm* — Li & Cai Intellectual Property Office

(57) ABSTRACT

A motor driver of modulating duty cycle is provided. The motor driver includes a control circuit, a driver circuit, an output stage circuit and a current detector circuit. The control circuit outputs a start-up control signal having a plurality of waveforms. The driver circuit outputs a start-up driving signal according to the start-up control signal. The output stage circuit operates to output a motor start-up signal to a motor according to the start-up driving signal for starting up the motor. The current detector circuit detects a current of the motor. The control circuit, according to the detected current of the motor, modulates duty cycles of the plurality of waveforms of the start-up control signal.

13 Claims, 6 Drawing Sheets

(58) Field of Classification Search
CPC ...... H02P 6/00; H02P 8/34; H02P 6/04; H02P 6/14; H03K 17/0822; H03K 19/215; H03K 2217/0081; H03K 2217/0054; H03K 7/08; H03K 17/042; H03K 2217/0027; H03K 3/017; H03K 11/33; F25B 2600/021; F25B 49/025; F25B 2600/111; B60H 1/00278; B60H 1/143; B60H 1/3205; B60H 2001/00307; G01R 31/3274; H02M 7/53871; H02M 1/0085; H02J 7/62; H02J 7/94; H02J 7/96
See application file for complete search history.

(56) References Cited

U.S. PATENT DOCUMENTS

| | | | | |
|---|---|---|---|---|
| 2022/0263449 | A1* | 8/2022 | Oba .................... | H02M 1/0009 |
| 2024/0291415 | A1* | 8/2024 | Korol ...................... | H02P 27/08 |

* cited by examiner

MOTOR DRIVER OF MODULATING DUTY CYCLE

CROSS-REFERENCE TO RELATED PATENT APPLICATION

This application claims the benefit of priority to Taiwan Patent Application No. 113111901, filed on Mar. 29, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor, and more particularly to a motor driver of modulating duty cycle.

BACKGROUND OF THE DISCLOSURE

Fans are often used to cool down processors and other heat-generating components in electronic devices. A driver circuit of a conventional motor driver outputs driving signals to a control terminal of a high-side switch and a control terminal of a low-side switch so as to start up a motor of the fan. However, when a common voltage received by a first terminal of the high-side switch is a low voltage, a duty cycle of the driving signal that is outputted to the control terminal of the high-side switch by the driver circuit of the conventional motor driver is maintained at a constant value that is not modulated with a change in the common voltage. As a result, not enough torque is generated for successfully starting up the motor.

SUMMARY OF THE DISCLOSURE

In response to the above-referenced technical inadequacies, the present disclosure provides a motor driver having of modulating duty cycle. The motor driver includes a control circuit, a driver circuit, an output stage circuit and a current detector circuit. The control circuit is configured to output a start-up control signal having a plurality of waveforms. The driver circuit is connected to the control circuit and configured to output a start-up driving signal according to the start-up control signal. The output stage circuit is connected to the driver circuit and a motor. The output stage circuit is configured to operate to output a motor start-up signal to the motor according to the start-up driving signal for starting up the motor. The current detector circuit is connected to the motor and the control circuit. The current detector circuit is configured to detect a current of the motor to output a motor current detected signal. The control circuit determines whether to modulate the start-up control signal according to the motor current detected signal. When the control circuit determines to modulate the start-up control signal, the control circuit modulates a plurality of duty cycles of the plurality of waveforms of the start-up control signal to respectively form a plurality of modulation duty cycles.

As described above, the present disclosure provides the motor driver of modulating the duty cycle. When the motor driver of the present disclosure starts up the motor by using the common voltage (that is a supply voltage) coupled with the circuit components of the motor driver, the current of the motor is changed with a change in the common voltage. In the motor driver of the present disclosure, the control circuit dynamically modulates the duty cycles of the plurality of waveforms of the start-up driving signal outputted to the output stage circuit according to a change in the current of the motor. In particular, when the motor driver of the present disclosure drives the motor by using the low common voltage, the motor is successfully started up through at least one minimum torque. Therefore, the motor driver of the present disclosure is capable of starting up the motor regardless of what the common voltage received by the motor driver of the present disclosure is.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
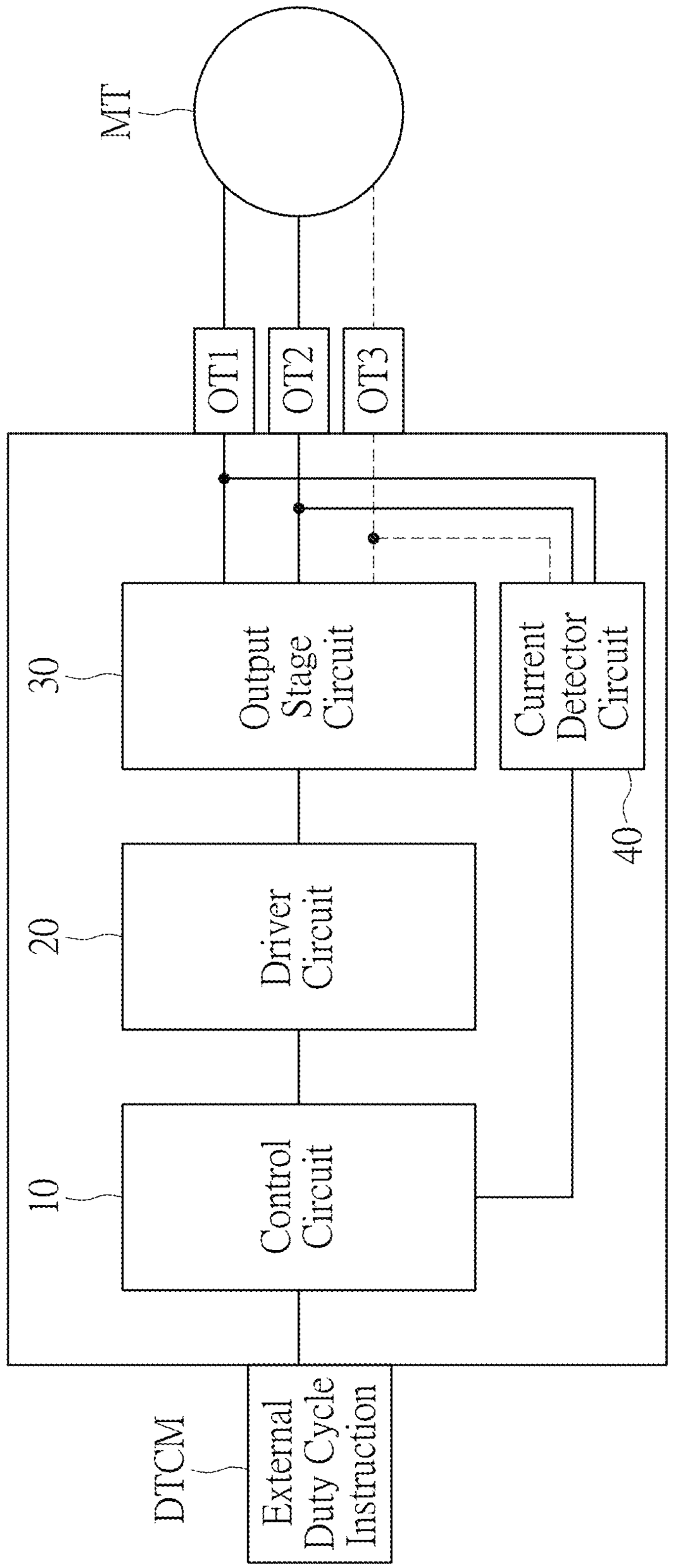
FIG. 1 is a block diagram of a motor driver of modulating duty cycle according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Figure 2:
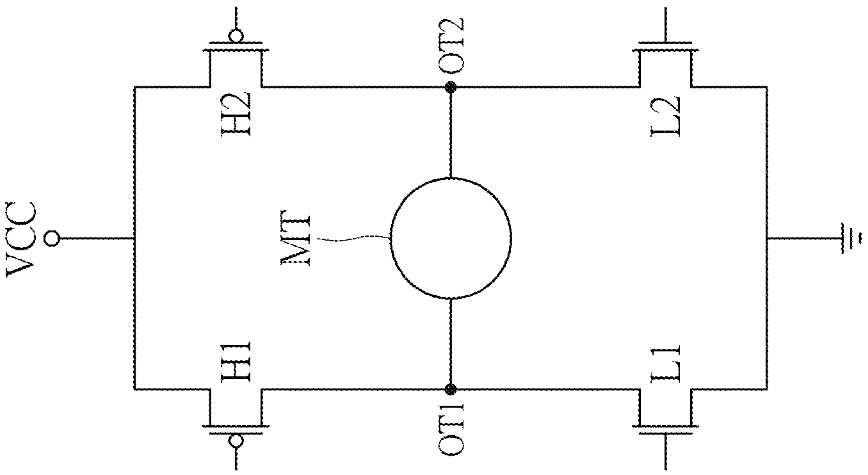
FIG. 2 is a circuit diagram of a single-phase motor and an output stage circuit of the motor driver of modulating the duty cycle according to the embodiment of the present disclosure.
Figure 3:
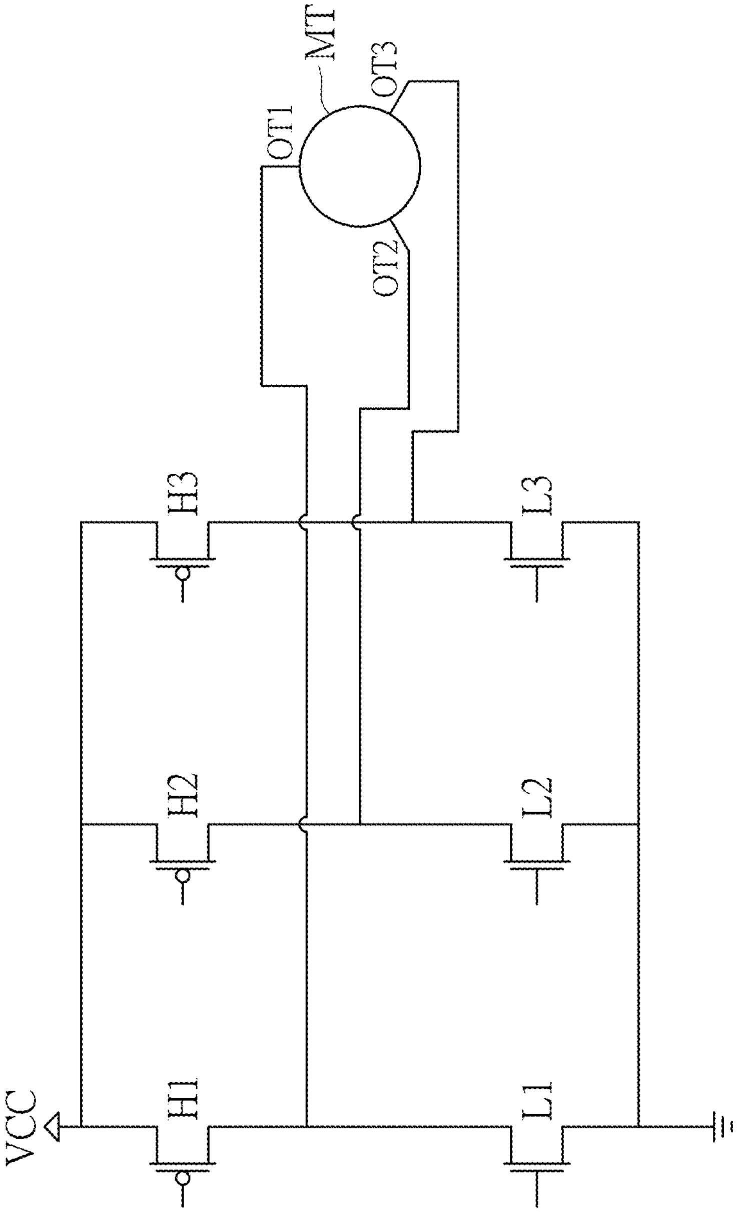
FIG. 3 is a circuit diagram of a three-phase motor and an output stage circuit of the motor driver of modulating the duty cycle according to the embodiment of the present disclosure.

Reference is made to FIG. 1 to FIG. 3, in which FIG. 1 is a block diagram of a motor driver of modulating duty cycle according to an embodiment of the present disclosure, FIG. 2 is a circuit diagram of a single-phase motor and an output stage circuit of the motor driver of modulating the duty cycle according to the embodiment of the present disclosure, and FIG. 3 is a circuit diagram of a three-phase motor and an output stage circuit of the motor driver of modulating the duty cycle according to the embodiment of the present disclosure.

The motor driver of the present disclosure includes a control circuit 10, a driver circuit 20, an output stage circuit 30 and a current detector circuit 40 as shown in FIG. 1.

The driver circuit 20 is connected to the control circuit 10 and the output stage circuit 30. The output stage circuit 30 is connected to a motor MT. The current detector circuit 40 is connected to the control circuit 10 and the motor MT.

The motor MT started up by the motor driver of the present disclosure may be a single-phase motor or a three-phase motor. If the motor MT is the single-phase motor, the output stage circuit 30 as shown in FIG. 1 may include a first high-side switch H1, a first low-side switch L1, a second high-side switch H2 and a second low-side switch L2 as shown in FIG. 2.

If the motor MT is the three-phase motor, the output stage circuit 30 as shown in FIG. 1 may include the first high-side switch H1, the first low-side switch L1, the second high-side switch H2, the second low-side switch L2, a third high-side switch H3 and a third low-side switch L3 as shown in FIG. 3.

A first terminal of the first high-side switch H1 is coupled with a common voltage VCC. A first terminal of the first low-side switch L1 is connected to a second terminal of the first high-side switch H1. A node between the first terminal of the first low-side switch L1 and the second terminal of the first high-side switch H1 is connected to a first terminal OT1 (such as a U-phase terminal) of the motor MT. A second terminal of the first low-side switch L1 is grounded.

A first terminal of the second high-side switch H2 is coupled with the common voltage VCC. A first terminal of the second low-side switch L2 is connected to a second terminal of the second high-side switch H2. A node between the first terminal of the second low-side switch L2 and the second terminal of the second high-side switch H2 is connected to a second terminal OT2 (such as a V-phase terminal) of the motor MT. A second terminal of the second low-side switch L2 is grounded.

A first terminal of the third high-side switch H3 is coupled with the common voltage VCC. A first terminal of the third low-side switch L3 is connected to a second terminal of the third high-side switch H3. A node between the first terminal of the third low-side switch L3 and the second terminal of the third high-side switch H3 is connected to a third terminal OT3 (such as a W-phase terminal) of the motor MT. A second terminal of the third low-side switch L3 is grounded.

A control terminal of the first high-side switch H1, a control terminal of the first low-side switch L1, a control terminal of the second high-side switch H2, a control terminal of the second low-side switch L2, a control terminal of the third high-side switch H3 and a control terminal of the third low-side switch L3 are connected to the driver circuit 20.

The control circuit 10 outputs a start-up control signal having a plurality of waveforms.

The driver circuit 20 outputs a start-up driving signal according to the start-up control signal from the control circuit 10. The start-up driving signal may include a plurality of sub-starting driving signals.

The output stage circuit 30 operates to output a motor start-up signal to the motor MT according to the start-up driving signal from the driver circuit 20 for starting up the motor MT. In detail, the driver circuit 20 outputs the plurality of sub-starting driving signals respectively to the control terminal of the first high-side switch H1, the control terminal of the first low-side switch L1, the control terminal of the second high-side switch H2, the control terminal of the second low-side switch L2, and the control terminal of the third high-side switch H3 and the control terminal of the third low-side switch L3.

Figure 4:
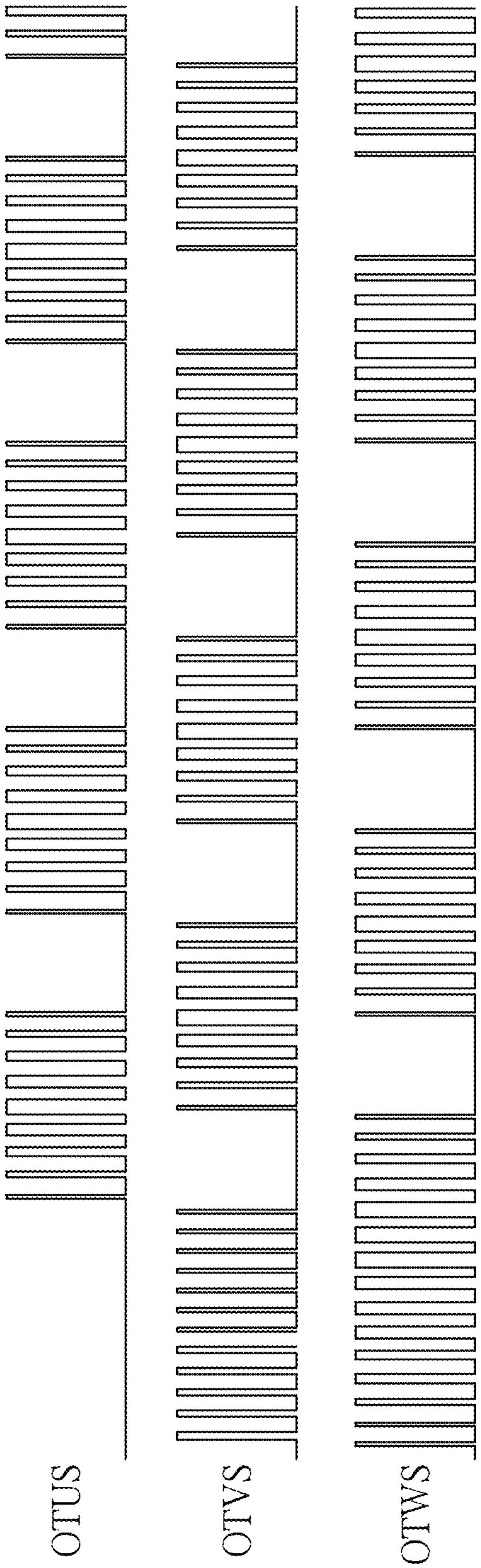
FIG. 4 is a waveform diagram of signals of the three-phase motor driven by the motor driver of modulating the duty cycle according to the embodiment of the present disclosure.

For example, the control terminal of the first high-side switch H1, the control terminal of the second high-side switch H2 and the control terminal of the third high-side switch H3 as shown in FIG. 3 respectively receive a plurality of sub-starting driving signals OTUS, OTVS, OTWS as shown in FIG. 4.

If the motor MT is the single-phase motor, the current detector circuit 40 may detect a current flowing through the first terminal OT1 of the motor MT, a current flowing through the second terminal OT2 of the motor MT or a combination thereof to output a motor current detected signal.

If the motor MT is the three-phase motor, the current detector circuit 40 may detect the current flowing through the first terminal OT1 (such as the U-phase terminal) of the motor MT, the current flowing through the second terminal OT2 (such as the V-phase terminal) of the motor MT, a current flowing through the third terminal OT3 (such as the W-phase terminal) of the motor MT or a combination thereof to output the motor current detected signal.

The control circuit 10 determines whether to modulate the start-up control signal that is outputted to the driver circuit 20 according to the motor current detected signal from the current detector circuit 40.

In detail, the control circuit 10 may determine whether the current of the motor MT that is indicated by the motor current detected signal reaches a target current to determine whether to modulate the start-up control signal.

When the current of the motor MT that is indicated by the motor current detected signal does not reach the target current, the control circuit 10 determines to modulate the start-up control signal outputted to the driver circuit 20.

When the control circuit 10 determines to modulate the start-up control signal outputted to the driver circuit 20, the control circuit 10 modulates the duty cycles of the plurality of waveforms of the start-up control signal to respectively form modulation duty cycles. The control circuit 10 continually outputs the start-up control signal in which the duty cycles of the plurality of waveforms are respectively equal to the modulation duty cycles to the driver circuit 20.

The control circuit 10 may modulate the start-up control signal outputted to the driver circuit 20 multiple times for starting up the motor MT. Then, when the current of the motor MT that is detected by the current detector circuit 40 reaches the target current, the control circuit 10 stops modulating the duty cycles of the waveforms of the start-up control signal.

It should be understood that, when the motor driver drives the motor MT by using a low voltage and the low duty cycles of the waveforms of the start-up control signal, not enough torque is generated for successfully starting up the motor MT.

Therefore, when the common voltage VCC (that is a supply voltage) coupled with the first terminal of the first high-side switch H1, the first terminal of the second high-side switch H2 and the first terminal of the third high-side switch H3 is lower than a supply voltage threshold, the control circuit 10 increases the duty cycles of the plurality of waveforms of the start-up control signal to form the modulation duty cycles for successfully starting up the motor MT and controlling the current of the motor MT to reach the target current.

When that the current of the motor MT indicated by the motor current detected signal that is received from the current detector circuit 40 by the control circuit 10 reaches the target current, the control circuit 10 stores the modulation duty cycles that are used for starting up the motor and controlling the current of the motor MT to reach the target current as target duty cycles.

The control circuit 10 continually outputs the start-up control signal in which the duty cycles of the plurality of waveforms are respectively equal to the target duty cycles to the driver circuit 20 such that the current of the motor MT is maintained to be equal to the target current.

Figure 5:
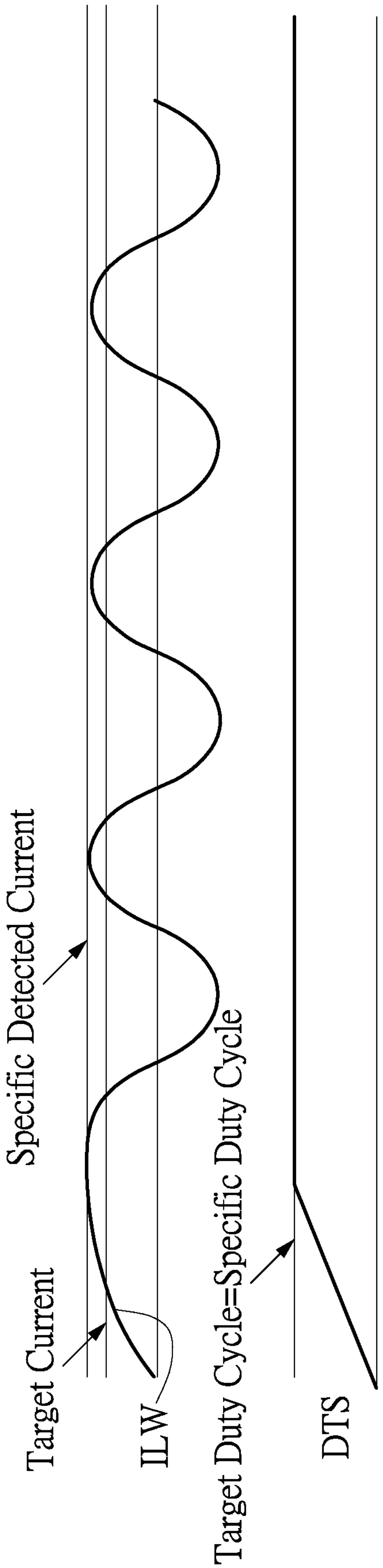
FIG. 5 is a waveform diagram of a start-up control signal and a motor current detected signal of the motor driver having of modulating the duty cycle according to the embodiment of the present disclosure.
Figure 6:
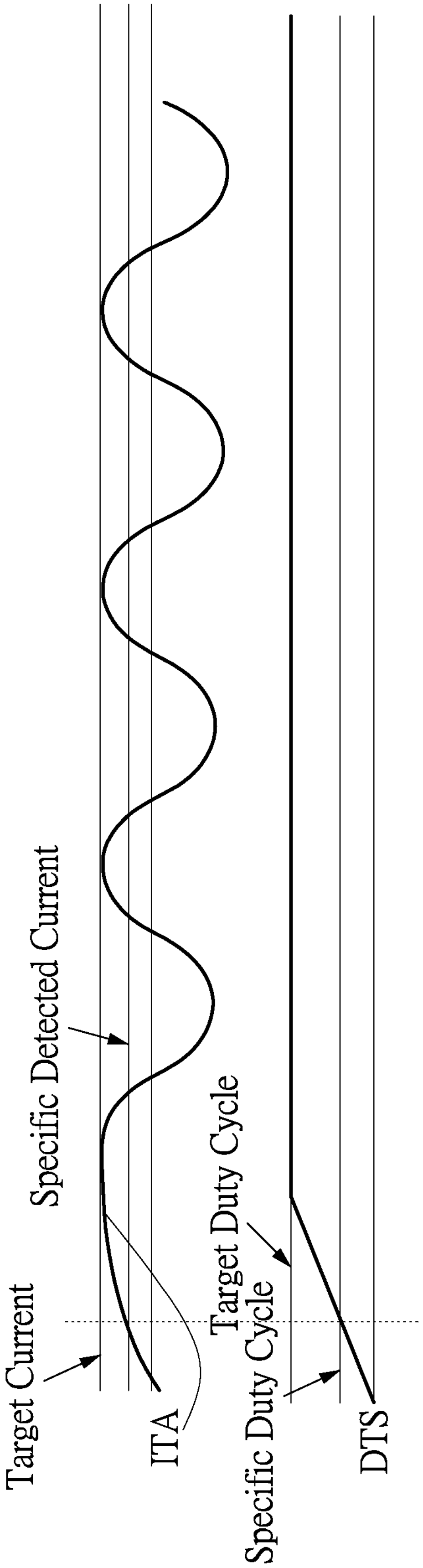
FIG. 6 is a waveform diagram of a start-up control signal and a motor current detected signal of the motor driver of modulating the duty cycle according to the embodiment of the present disclosure.

Reference is made to FIG. 1, FIG. 5 and FIG. 6, in which FIG. 1 is a block diagram of a motor driver of modulating the duty cycle according to an embodiment of the present disclosure, and FIG. 5 and FIG. 6 are waveform diagrams of a start-up control signal and a motor current detected signal of the motor driver of modulating the duty cycle according to the embodiment of the present disclosure.

The control circuit 10, according to an external duty cycle instruction DTCM from an external instructing circuit, sequentially modulates the duty cycles of the plurality of waveforms of the start-up control signal until when the duty cycle of one of the plurality of waveforms of the start-up control signal reaches a specific duty cycle instructed by the external duty cycle instruction DTCM.

When the duty cycle DTS of the one of the plurality of waveforms of the start-up control signal that is outputted to the driver circuit 20 by the control circuit 10 reaches the specific duty cycle, the current detector circuit 40 detects the current of the motor MT as a specific detected current.

When the specific detected current is smaller than the target current (that is a peak value of a waveform of a target current signal ITA as shown in FIG. 6), the control circuit 10 increases the duty cycle DTS of each of the plurality of waveforms of the start-up control signal from the specific duty cycle until when the current of the motor MT reaches the target current.

The control circuit 10 stores the modulated duty cycles DTS (that are the modulation duty cycles) respectively of the plurality of waveforms of the start-up control signal, that are used for starting up the motor and controlling the current of the motor MT to reach the target current, as the target duty cycles.

The control circuit 10 continually outputs the start-up control signal in which the duty cycles of the plurality of waveforms are respectively equal to the target duty cycles to the driver circuit 20 such that the current of the motor MT is maintained to be equal to or larger than the target current.

In conclusion, the present disclosure provides the motor driver of modulating the duty cycle. When the motor driver of the present disclosure starts up the motor by using the common voltage (that is the supply voltage) coupled with the circuit components of the motor driver, the current of the motor is changed with a change in the common voltage. In the motor driver of the present disclosure, the control circuit, according to a change in the current of the motor, dynamically modulates the duty cycles of the plurality of waveforms of the start-up driving signal outputted to the output stage circuit. In particular, when the motor driver of the present disclosure drives the motor by using the low common voltage, the motor is successfully started up through at least one minimum torque. Therefore, the motor driver of the present disclosure is capable of starting up the motor regardless of what the common voltage received by the motor driver of the present disclosure is.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver having a start up duty cycle modulation mechanism of modulating duty cycle, comprising:

a control circuit configured to output a start-up control signal having a plurality of waveforms;

a driver circuit connected to the control circuit and configured to output a start-up driving signal according to the start-up control signal;

an output stage circuit connected to the driver circuit and a motor, and configured to operate to output a motor start-up signal to the motor according to the start-up driving signal for starting up the motor; and a current detector circuit connected to the motor and the control circuit, and configured to detect a current of the motor to output a motor current detected signal;

wherein the control circuit determines whether to modulate the start-up control signal according to the motor current detected signal;

wherein, when the control circuit determines to modulate the start-up control signal, the control circuit modulates a plurality of duty cycles of the plurality of waveforms of the start-up control signal to respectively form a plurality of modulation duty cycles;

wherein, when the current of the motor that is indicated by the motor current detected signal does not reach a target current, the control circuit increases the duty cycles of the plurality of waveforms of the start-up control signal to form the modulation duty cycles.

2. The motor driver according to claim 1, wherein the output stage circuit includes:

a first high-side switch, wherein a first terminal of the first high-side switch is coupled with a common voltage;

a first low-side switch, wherein a first terminal of the first low-side switch is connected to a second terminal of the first high-side switch, a node between the first terminal of the first low-side switch and the second terminal of the first high-side switch is connected to a first terminal of the motor, and a second terminal of the first low-side switch is grounded;

a second high-side switch, wherein a first terminal of the second high-side switch is coupled with the common voltage; and a second low-side switch, wherein a first terminal of the second low-side switch is connected to a second terminal of the second high-side switch, a node between the first terminal of the second low-side switch and the second terminal of the second high-side switch is connected to a second terminal of the motor, and a second terminal of the second low-side switch is grounded;

wherein a control terminal of the first high-side switch, a control terminal of the first low-side switch, a control terminal of the second high-side switch and a control terminal of the second low-side switch are connected to the driver circuit.

3. The motor driver according to claim 2, wherein, when the common voltage that is coupled with the first terminal of the first high-side switch and the first terminal of the second high-side switch is lower than a supply voltage threshold, the control circuit increases the duty cycles of the plurality of waveforms of the start-up control signal to form the modulation duty cycles for controlling the current of the motor to reach the target current.

4. The motor driver according to claim 2, wherein the output stage circuit further includes:

a third high-side switch, wherein a first terminal of the third high-side switch is coupled with the common voltage; and a third low-side switch, wherein a first terminal of the third low-side switch is connected to a second terminal of the third high-side switch, a node between the first terminal of the third low-side switch and the second terminal of the third high-side switch is connected to a third terminal of the motor, and a second terminal of the third low-side switch is grounded;

wherein a control terminal of the third high-side switch and a control terminal of the third low-side switch are connected to the driver circuit.

5. The motor driver according to claim 4, wherein, when the common voltage that is coupled with the first terminal of the second high-side switch is lower than a supply voltage threshold, the control circuit increases the duty cycles of the plurality of waveforms of the start-up control signal to form the modulation duty cycles for controlling the current of the motor to reach the target current.

6. The motor driver according to claim 1, wherein the motor is a single-phase motor, and the current detector circuit detects a current flowing through a first terminal of the motor, a current flowing through a second terminal of the motor, or a combination thereof.

7. The motor driver according to claim 1, wherein the motor is a three-phase motor, and the current detector circuit detects a current flowing through a first terminal of the motor, a current flowing through a second terminal of the motor, a current flowing through a third terminal of the motor, or any combination thereof.

8. The motor driver according to claim 1, wherein the control circuit determines whether the current of the motor that is indicated by the motor current detected signal reaches the target current to determine whether to modulate the start-up control signal.

9. The motor driver according to claim 8, wherein the control circuit, according to an external duty cycle instruction from an external instructing circuit, sequentially modulates the duty cycles of the plurality of waveforms of the start-up control signal until the duty cycle of one of the plurality of waveforms of the start-up control signal reaches a specific duty cycle instructed by the external duty cycle instruction.

10. The motor driver according to claim 9, wherein, when the duty cycle of the one of the plurality of waveforms of the start-up control signal that is outputted to the driver circuit by the control circuit reaches the specific duty cycle, the current detector circuit detects the current of the motor as a specific detected current.

11. The motor driver according to claim 10, wherein, when the specific detected current is smaller than the target current, the control circuit increases the duty cycle of each of the plurality of waveforms of the start-up control signal from the specific duty cycle until the current of the motor reaches the target current.

12. The motor driver according to claim 1, wherein, when the current of the motor that is indicated by the motor current detected signal reaches the target current, the control circuit stores the modulation duty cycles that are used for starting up the motor such that the current of the motor reaches the target current as target duty cycles.

13. The motor driver according to claim 12, wherein the control circuit continually outputs the start-up control signal in which the duty cycles of the plurality of waveforms are respectively equal to the target duty cycles to the driver circuit.

* * * * *